United States Patent

[11] 3,592,556

| [72] | Inventor | David R. Campbell |
| | | Salt Lake City, Utah |
| [21] | Appl. No. | 596,003 |
| [22] | Filed | Nov. 21, 1966 |
| [45] | Patented | July 13, 1971 |
| [73] | Assignees | David R. Campbell; |
| | | Charles N. Campbell; Doyle L. Green, , |
| | | part interest to each |

[54] CONVEYOR WITH NUB BELT
8 Claims, 12 Drawing Figs.

[52] U.S. Cl. ................................................ 415/1,
415/5, 198/197, 198/54, 198/12
[51] Int. Cl. .......................................... F04b 19/14,
B65g 47/18, F04b 19/16
[50] Field of Search .................................. 198/198,
204, 54, 178, 114, 115, 122, 139, 206, 197, 168;
183/62, 63, 72; 415/1, 5

[56] References Cited
UNITED STATES PATENTS

| 874,983 | 12/1907 | Norton | 198/198 |
| 947,592 | 1/1910 | Gilman | 198/204 X |
| 1,204,620 | 11/1916 | Vulgamott | 198/54 X |
| 1,762,473 | 6/1930 | Hancock | 198/198 |
| 2,301,084 | 11/1942 | Sinden | 198/168 |

*Primary Examiner*—Henry F. Raduazo
*Attorney*—Robert R. Finch

ABSTRACT: A means and method of elevating liquids and semiliquids employing a conveying belt having nubs projecting from the working face, the nubs are not oriented in transverse alignment but are mismatched in a particular manner depending upon the materials being conveyed; the belt may have a confined area in which to travel in the form of a rectangular tube, thereby allowing virtually no space for roll back of the materials.

PATENTED JUL 13 1971

David R. Campbell
INVENTOR

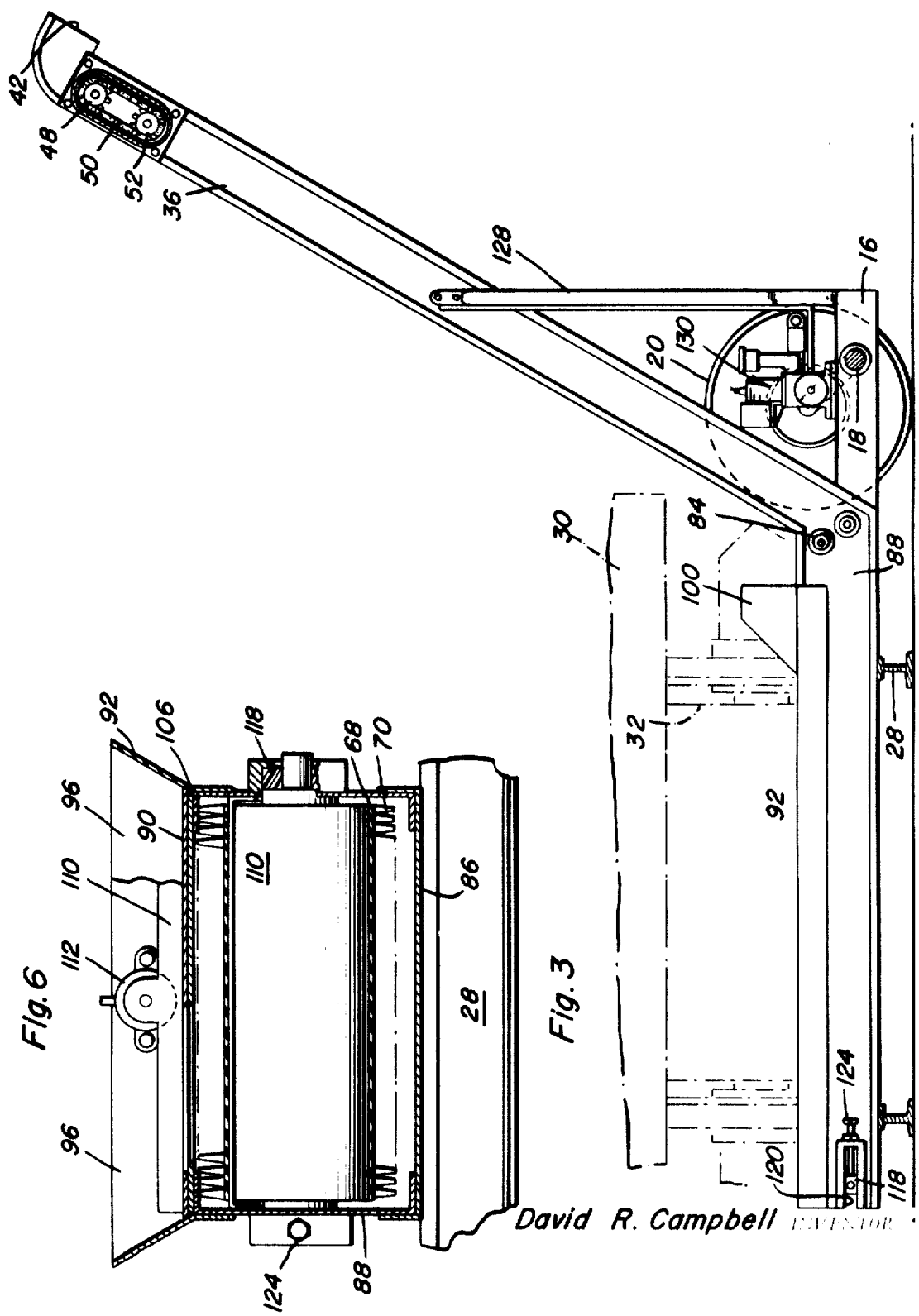

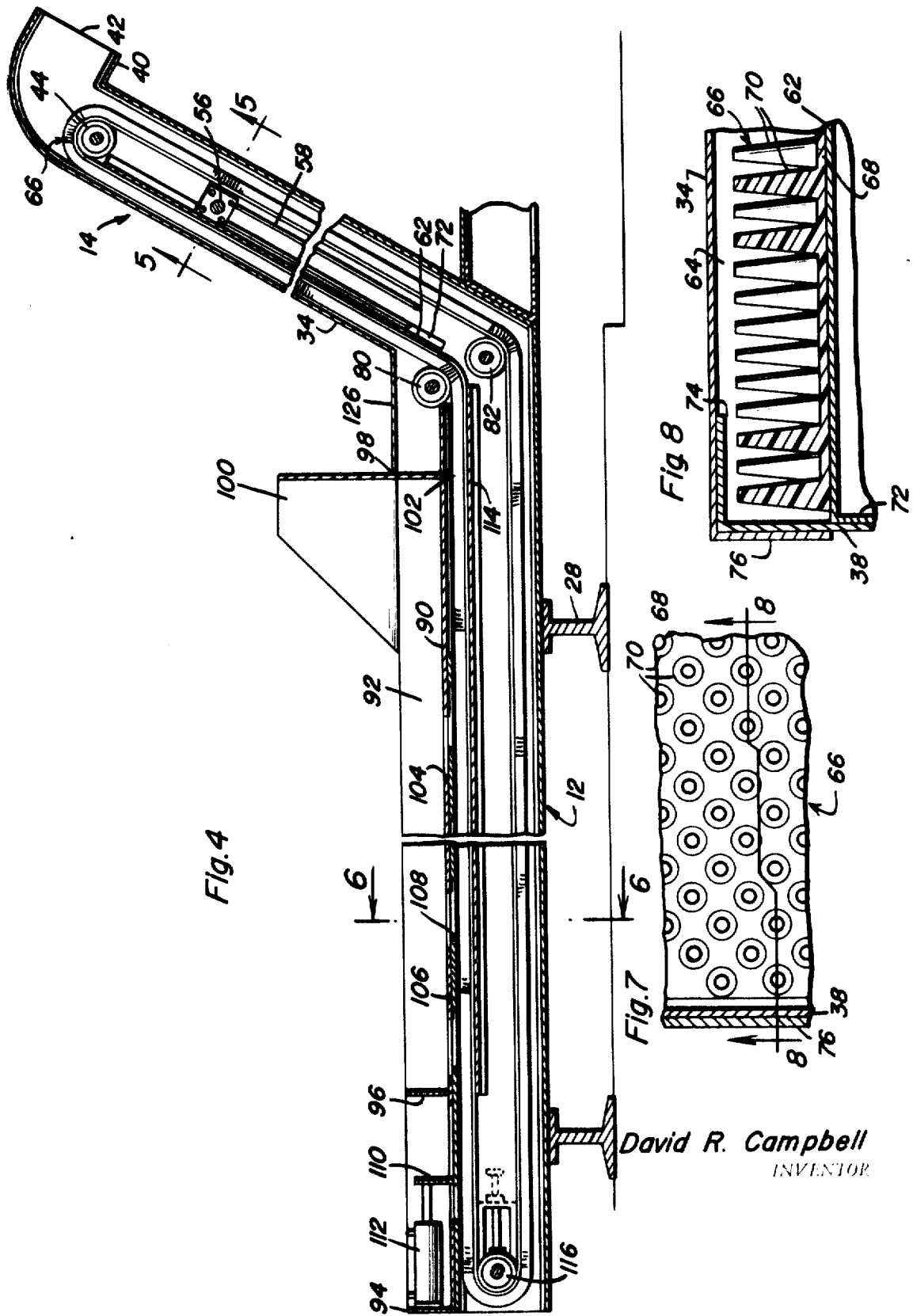

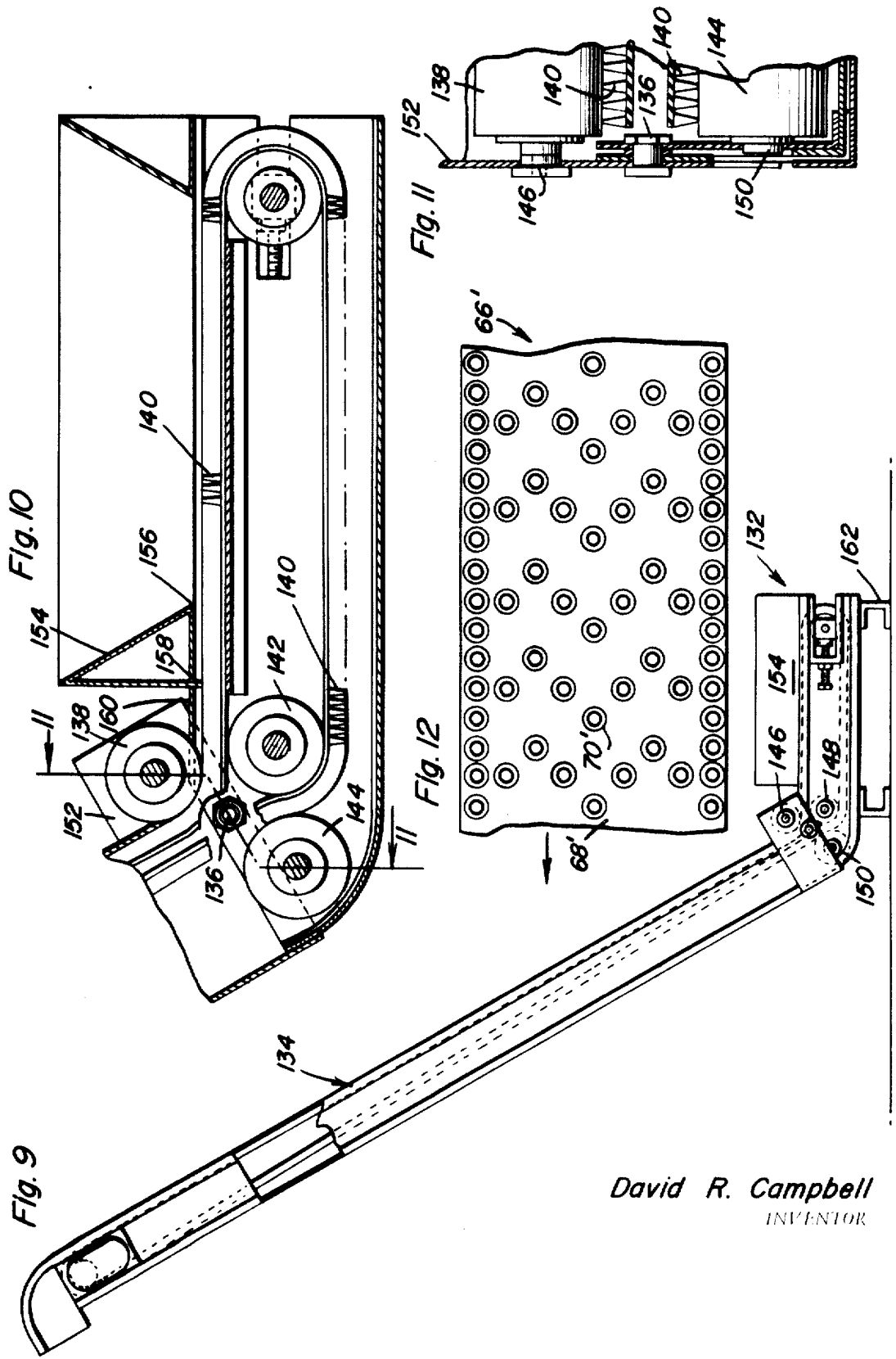

3,592,556

1

CONVEYOR WITH NUB BELT

This application is a continuation of application Ser. No. 374,778, filed June 12, 1964, now abandoned.

The present invention generally relates to a novel method and apparatus employing the method for conveying and elevating bulk commodities with a belt conveyor at inclined angles substantially in excess of other types of belt conveyors with the present invention being capable of conveying and elevating such materials even in an extreme vertical position. Materials such as fertilizers, grains, salt, cement, flour and other similar substances may be effectively conveyed at an extreme angle of inclination and this is also true of slurries and other liquid or semiliquid materials.

The primary feature of the present invention resides in the construction of the conveyor belt which includes a plurality of raised or projecting nubs of rubber or similar material which move in a confined area at a relatively high-linear speed. The nubs on the conveyor belt are not orientated in transverse alignment but are mismatched and orientated in a particular manner depending upon the materials being conveyed and the linear speed of the belt may be varied depending upon the materials being conveyed and the angle of incline at which they are being conveyed. The area of confinement for the inclined conveying area of the belt is generally in the form of a rectangular tube within which the upper flight of the belt runs with the tube having a top wall closely adjacent to but spaced from the upper end of the nubs thereby allowing virtually no space for roll back or fall back of the materials being elevated. The height and spatial characteristics of the nubs on the belts may be varied depending upon the type of material to be conveyed. For example, a free flowing liquid would need nubs spaced closer together than would a granular substance such as grain.

Another object of the present invention is the provision of a method and conveying apparatus which combines the confining properties of nubs on a belt, the high speed of linear movement of the belt and the confining area formed by the tube in which the belt runs thus making it possible to elevate large volumes of material at extreme angles of incline with a relatively small conveyor. Further, in the case of free-flowing materials such as dry powders or liquids, this combination of speed and confinement in a closed tube creates a partial vacuum at the intake of the tube which helps to increase the filling and carrying efficiency of the conveyor.

Yet another object of the present invention is to provide a conveyor incorporating the principles of the above invention therein which may be stationarily orientated or adjustably orientated and used for various purposes. In some instances, materials having a lower rate of flow will feed into the confining area between the nubs better when the belt is in a horizontal position. Thus, the belt may be loaded from a horizontally disposed hopper or the like after which the direction of the belt is changed to the inclined or vertical position for elevating. An additional feature of the horizontally disposed hopper arrangement is the provision of a scraper blade which allows the material to fill the space between the nubs only to the top thereof thus preventing the materials from having an excessive depth on the belt.

Yet another object of the present invention is to provide a belt conveyor assembly which is employed to practice a novel method of conveying and elevating which is relatively simple in construction, easy to use, efficient in conveying large volumes of flowable materials, capable of conveying and elevating such materials at an extreme incline with the apparatus being relatively inexpensive to manufacture and operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

FIG. 3 is a side elevational view of the construction of FIG. 1 illustrating the conveyor associated with the discharge hopper of a railroad car;

FIG. 4 is a longitudinal, sectional view taken substantially upon a plane passing along section line 4-4 of FIG. 1 illustrating further structural details of the invention;

FIG. 6 is a transverse, sectional view taken substantially upon a plane passing along section line 6-6 of FIG. 4 illustrating further structural details of the conveyor;

FIG. 7 is an enlarged fragmental view of the conveyor belt and the orientation of the nubs thereon;

FIG. 8 is a detailed sectional view taken substantially upon a plane passing along section line 8-8 of FIG. 7 illustrating the specific structure of the conveyor belt and its relationship to the rectangular tube in which it moves;

FIG. 9 is a side elevational view, with portions broken away, illustrating the modified form of the invention in which the discharge chute of the conveyor may be angularly adjusted;

FIG. 10 is a detailed sectional view of the lower end portion of the conveyor of FIG. 9 illustrating the hopper and idler structure for enabling pivotal movement of the chute;

FIG. 11 is a detailed sectional view taken substantially upon a plane passing along section line 11-11 of FIG. 10 illustrating the structural details of the idlers which enable adjustment of the inclined chute; and FIG. 12 is a plan view of a modified belt structure especially useful in conveying liquid materials.

Figure 1:
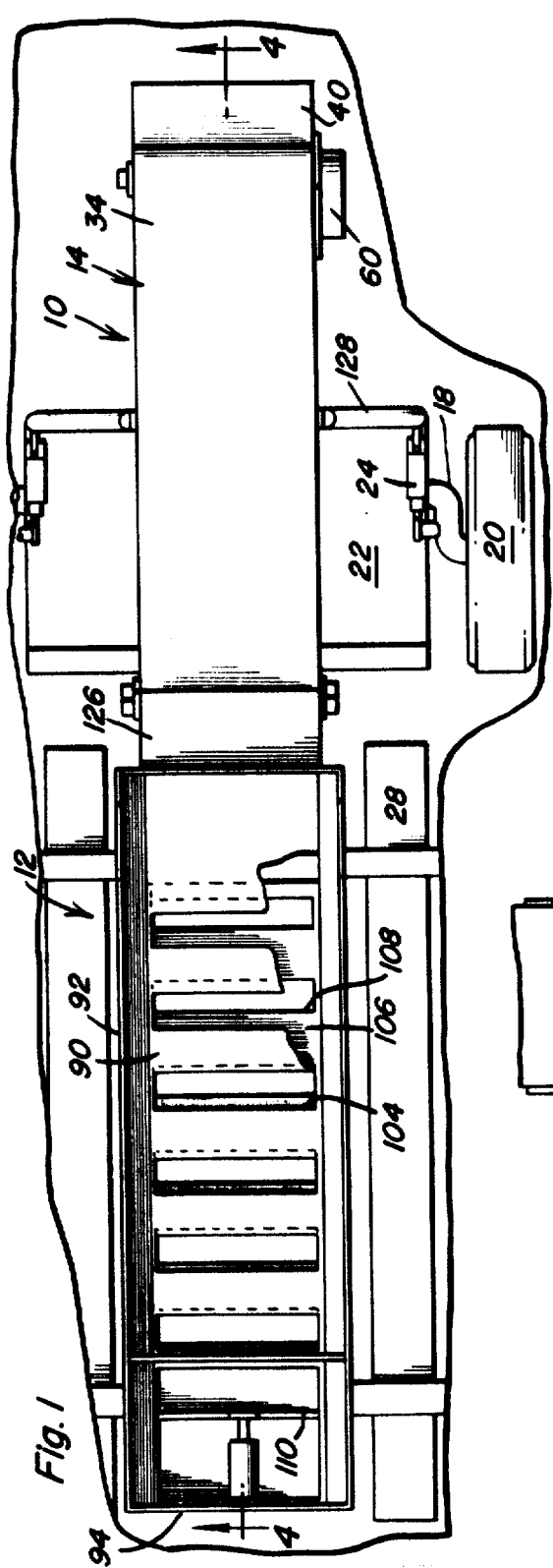
FIG. 1 is a top plan view of the conveyor of the present invention.

Referring now specifically to the drawings, the numeral 10 generally designates the conveying apparatus of the present invention which includes a horizontal portion 12 and a vertically extending portion 14 which may be disposed at any suitable angle and even at an extreme vertical position. In this form of the invention, the horizontal portion 12 and the upwardly extending portion 14 of the conveyor 10 are rigidly associated with each other and are supported by a frame 16 which supports crank axles 18 having wheels 20 on the outer end thereof whereby adjustment of the crank axles 18 about the point of connection with the frame 16 will enable the frame 16 to be moved vertically. The frame 16 includes a platformlike structure 22 to which the crank axles 18 are journaled and a suitable piston and cylinder type motor 24 or the like interconnects the crank axles 18 and the platform 22 for enabling swinging movement of the wheels 20 in a vertical plane for elevating and lowering the conveyor. This enables the conveyor to be transported easily and yet placed in position and lowered for support on a suitable supporting surface such as a pair of railroad rails 28 whereby the device may be effectively employed for emptying a hopper-type freight car 30 having the usual type of discharge chute 32 as illustrated in FIG. 3.

The conveyor structure in the upwardly inclined portion 14 is provided with a top wall 34 and a bottom wall 36 interconnected by sidewalls 38 thus forming a substantially hollow rectangular chute or housing. The upper end of the chute is disposed in angular relation as at 40 for forming a discharge opening 42 which may be disposed at any suitable angle. Journaled between the sidewalls 38 at the upper end of the tubular housing is an end drum or roller 44 journaled in suitable bearings 46 therefor which are attached to the sidewalls 38. One end of the roller 44 is provided with a drive sprocket 48 engaged by a drive chain 50 which also encircles a drive gear 52 connected to the output shaft 54 of a hydraulic motor 56 which is preferably an orbit hydraulic motor which will receive hydraulic fluid under pressure and returns this fluid through conduits 58 connected to the motor 56 and connected to a suitable supply course such as a pump or the like.

The motor 56 is also connected to the sidewall 58 and a removable cap 60 is provided for the drive chain and gear assembly thus preventing any entanglement with the drive mechanism and also protecting the drive mechanism from soil, dirt and the like to facilitate the long wearing qualities thereof.

Disposed transversely of the tubes between the walls 38 is a partition 62 spaced in parallelism to the front wall 34 thus forming a substantially rectangular tube 64 in the form of a confined area for receiving a conveyor belt 66 which includes a solid belt portion 68 having a plurality of upstanding nubs 70 integral therewith with the free end of the nubs being disposed closely adjacent to but spaced from the top wall 34. Thus, the conveyor belt 66 runs in a confined tube 64 defined by the partition 62, top wall 34 and sidewalls 38 as illustrated in FIG. 8. For attachment of the partition 62, the end edges thereof are provided with depending flanges 72 and for rigidity the partition 62 also has the flanges 72 and the edges of the sidewalls 38 are also provided with perpendicular extending flanges 74 and the edges of the top wall 34 also has perpendicular flanges 76 and the bottom plates or walls 36 is also provided with similar flanges 78 thereon all of which interfit and are secured together to form a rigid chute for receiving the conveyor belt.

At the bottom of the inclined portion where it joins with the horizontal portion 12, there is provided a pair of idler rollers 80 and 82 which engage the top surfaces of the upper and lower flights of the conveyor belt 66. The rollers 80 and 82 are journaled in suitable bearings 84 thus forming rolling contact with the flights of the belt where it changes direction from a horizontal disposition to a vertical disposition.

The horizontal portion 12 of the conveyor has a bottom 86 which may be a continuation of the bottom 36 and also sidewalls 88 which may be a continuation of the sidewalls 38. Also, a top plate or member 90 is provided operable to the top wall 34. However, the end of the top plate 90 adjacent the roller 80 is interrupted for receiving the roller 80 which is generally tangential thereto although the roller 80 does project slightly below the top plate 90. An upstanding and outwardly flared guide wall 92 is provided along the side edges of the top plate 90 and an end wall 94 interconnects the guide walls 92. Also, a transverse partition wall 96 interconnects the guide walls 92. Also, a transverse partition wall 96 interconnects the guide walls 92 to form an entrance area for the top plate 90 so that material deposited thereon will be retained between the partition plate 96 and a partition plate 98 which is disposed so that it projects above the guide wall 90 as illustrated in FIG. 4 and is provided with partial sidewalls 100. The bottom edge of the partition 98 extends below the top plate 90 and forms a scraper blade 102 disposed at a predetermined elevation above the top surface of the conveyor belt 66 for limiting the depth of material on the conveyor belt 66.

The top plate 90 is provided with a plurality of transversely extending rectangular openings 104 through which material is discharged onto the conveyor belt 66. The openings 104 are substantially in the nature of a grate and a sliding top plate 106 underlies the top plate 90 and is provided with corresponding openings 108 that are in selective registry with the openings 104 thus enabling the quantity of material disposed onto the conveyor belt 66 to be regulated. For operating the sliding plate 106, one end thereof is provided with an upturned lug 110 connected to a hydraulically operated piston and cylinder-type motor 112 which has the other end engaged with or connected with the transverse end wall 94. The motor 112 is also communicated with a suitable source of supply with a suitable control valve being provided for operating the sliding plate 106 thus forming a sliding plate-type valve assembly when combined with the top plate 90.

The upper flight of the horizontal portion of the conveyor belt 66 is supported by a partition wall 114 equivalent to the partition wall 62 and the conveyor belt is also entrained over an end roller 116 journaled in suitable bearings 118 slidable in longitudinal slots 120 with an adjustment screw 124 being provided in the inner end of the slot for engagement with the bearing block 118 for adjusting and maintaining the tension on the conveyor belt 66.

For protecting the end roller 80, there is provided a partial shield or top plate 126 between the partition 98 and the top wall 34 and suitable bracing 128 is provided for supporting the inclined portion 14 of the conveyor 10. For producing the necessary hydraulic power, a small gasoline engine 130 of the air cooled type may be supported on the frame member 16 and connected with a suitable hydraulic pump and reservoir structure for producing a suitable supply of hydraulic fluid for conveyance to the orbital hydraulic motor 66 and the piston and cylinder hydraulic motor 112 through suitable hydraulic conduits and through suitable control valves. It will be appreciated that other means may be provided for supplying fluid under pressure for operation of the hydraulic motor.

FIG. 7 discloses the orientation of the nubs or projections 70 on the continuous belt 68. The nubs 70 as well as the belt 68 is preferably constructed of rubber and as illustrated in FIG. 7, the nubs 70 are arranged in mismatched rows across its width between which material being conveyed is confined. The belt assembly 66 is operated at high-linear speed such as between 600 feet per minute and 1,800 feet per minute depending on the material being conveyed. Moreover, the belt assembly 66 operates within the closed rectangular tube 64 which is constructed in such a manner that very little or limited space is provided between the top of the nubs 70 and the top plate 34 of the tube as illustrated in FIG. 8. This allows virtually no space for roll back or fall back of the material being elevated. The height and facing of the nubs 70 on the belt is varied depending upon the type of material to be conveyed. For example, a free flowing liquid would need nubs spaced closer together than would a granular substance such as grain. One example of a variation in the nub arrangement is illustrated in FIG. 12 of the drawings in which the continuous belt is designated by numeral 68' and the nubs are designated by numeral 70'. This nub configuration or arrangement provides for a closely spaced relationship of the nubs along the side edges of the belt 68' thus making possible a minimum side loss and the provision of the nubs through the rest of the belt 68' is to insure a minimum of space for back flow. In actual tests on a relatively small test unit, the belt has been used to elevate over 1,100 tons of dry sand at an inclined angle of 80° in which the belt is 4 inches wide thus indicating the high-volume capacity of the conveyor of the present invention. The high-volume capacity is obtained by the combination of the confining properties of the nub and the high speed with which the belt moves through the closed tube thus rendering it possible to elevated large volumes of material at extreme angles of incline with a relatively small conveyor. In actuality and in some cases such as when conveying free flowing material such as dry powders or liquids, the particular structure and combination of the present invention which combines speed and confinement in a closed tube will actual create a partial vacuum at the intake end of the tube which helps to increase the filling and carrying efficiency of the conveyor.

Figure 5:
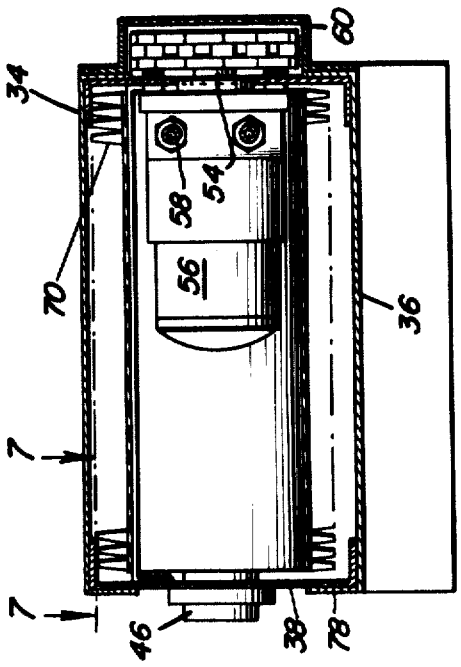
FIG. 5 is a transverse, sectional view taken substantially upon a plane passing along section line 5-5 of FIG. 4 illustrating the relationship of the conveyor belt and nubs to the top plate of the conveyor.
Figure 2:
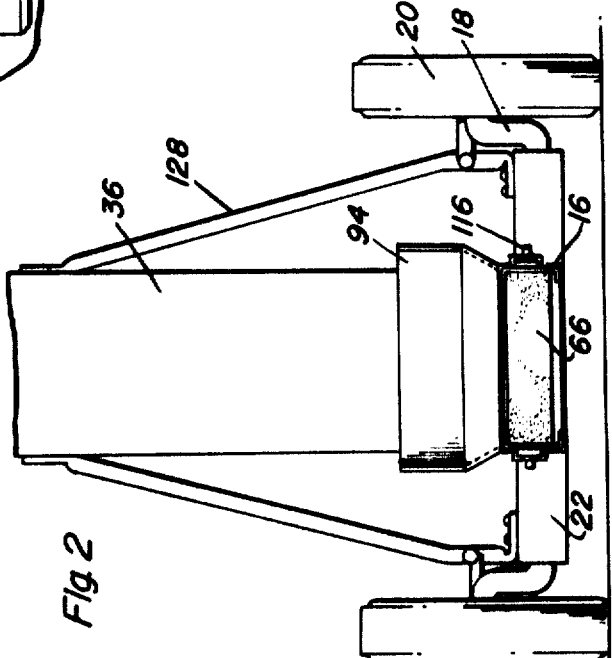
FIG. 2 is an end elevational view of the construction of FIG. 1.

In the apparatus disclosed in FIGS. 1—8, the belt is loaded in a horizontal position which is desirable with materials having a lower rate of flow. After the belt is loaded with the area between the nubs filled, the direction of the belt is changed to an inclined relation or vertical position for elevating. The scraper blade 102 at the inner end of the hopper allows the material to fill only to the top of the nubs. The belt with the material thereon then passes under the idler roller 80 which changes the direction of the belt and at the same time partially compacts the material between the nubs in certain instances. The sliding plate assembly 106 not only produces a control for the capacity of the conveyor but also serves to support the weight of the material in the hopper so that it will not bear down on the conveyor belt which would increase friction against the partition or slider bed 114. This is especially desirable when unloading hopper-type railroad cars where the entire weight of the contents of the railroad car may discharge into the hopper. Of course, the specific details of the hopper may be varied to adapt the conveyor for various uses and the relative length of the horizontal portion to the inclined portion may vary depending upon the elevating or conveying job to be accomplished. The materials being carried by the conveyor belt are discharged out of the discharge opening 42 by virtue of the spaces between the nubs enlarging as the belt passes over the end roller 44 thus releasing the material and due to momentum of the material, it will follow a normal path of trajectory out of the discharge opening 42.

FIGS. 9—11 illustrate another embodiment of the invention which may be attached to the rear of a truck body or the like for discharging material from a discharge opening in the tail gate thereof. In this form of the invention, the lower portion of the conveyor is generally designated by 132 and this portion is relatively short as compared to the inclined portion 134. The inclined portion 134 is the same as the inclined portion 14 but it is pivotally connected to the lower portion by a hinge bolt 136 extending transversely between the overlapping edge portions of the lower portion 132 and the upper portion 134 as illustrated in FIG. 10. In this form of the invention, an idler roller 138 engages the top surface of the conveyor belt assembly 140 as it passes thereunder and a pair of idlers 142 and 144 engage the inner and outer surfaces of the belt assembly 140 respectively on its bottom or return flight so that pivotal movement of the upper section 134 about the hinge bolt 136 will not increase or decrease the tension on the belt assembly 140 to any appreciable degree. The idler rollers 138, 142 and 144 are journaled in suitable bearings 146, 148 and 150 with the bearing 150 being preferably flush so that the upwardly extending portion 134 may telescope thereover. The bearing assembly 146 for the roller 138 is carried by laterally extending brackets 152 which are in the form of continuations of the sidewalls of the upwardly extending portion 134 of the conveyor.

In this form of the invention, the inclined walls 154 which define a hopper are connected directly to the edges of an opening 156 for introducing material onto the conveyor belt assembly. A depending scraper blade 158 is provided through the top plate 160 for limiting the depth of material on the conveyor belt assembly to a depth substantially equal to the height of the nubs thereon. In this construction, the idler roller 138 also enables change of direction by engaging the filled upper surface of the conveyor assembly for also compacting the materials in the spaces between the nubs in the event such materials are of a type that will be compact. If liquids are being conveyed, of course, the idler acts merely to change direction of the conveyor belt and serves as means to prevent down flow or backflow of such liquid material. The entire conveyor of FIGS. 9—12 may be supported on suitable framing elements 162 which may be attached to any suitable supporting mechanism so that the device may be supported from a vehicle structure or any other structure and any suitable source of hydraulic pressure may be communicated with the orbital hydraulic motor which drives the conveyor belt assembly which is the only power unit employed in this form of the invention. For example, if the device is to be used with a farm implement or truck having a pressurized hydraulic system, suitable quick-disconnect couplings may be provided for communicating with the system for employing the existing pressure system on the vehicle for use in driving the orbital motor. In addition to the use of the hydraulic motor, other sources of power may be used such as a direct drive from a gasoline engine or electric motor, power takeoff or by any other available source of power.

Additionally, the conveyor may be orientated at any incline and even in a vertical position with an inclined hopper opening upwardly for receiving material to be conveyed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

I claim:

1. A conveyor comprising a tube having a top wall and a substantially parallel bottom wall attached thereto by sidewalls, a conveyor belt mounted to run in the tube along the top surface of said bottom wall and having spaced apart upwardly projecting nubs extending substantially to the undersurface of said top wall for moving material on the belt in the area defined by the bottom wall, top wall and sidewalls.

2. A conveyor comprising an inclined tube having a top wall and a substantially parallel bottom wall attached thereto by sidewalls, a conveyor belt mounted to run in the tube along the top surface of said bottom wall and having spaced apart upwardly projecting nubs extending substantially to the undersurface of said top wall for moving material in the area defined by the bottom wall, top wall and sidewalls.

3. A conveyor as defined by claim 2 wherein the nubs on the belt have a longer length than transverse dimension and relatively large spaces therebetween with adjacent nubs being mismatched to retard flow of material down the inclined belt.

4. A conveyor as defined by claim 1 further comprising a filling hopper operatively associated with the tube for introducing bulk material onto the belt, and scraper blade means positioned where the belt leaves the hopper for limiting the thickness of material on the belt substantially level with the ends of the nubs.

5. A conveyor as defined by claim 2 further comprising rollers positioned at each end of the tube, the belt being trained over said rollers, and high-spped drive means operatively connected to one of said rollers to move the conveyor at a high rate of speed.

6. A conveyor as defined in claim 4 wherein said hopper includes a perforated top plate and a slidable perforated plate in registry therewith for controlling the inflow of material onto the belt and for supporting the weight of the material in the hopper.

7. A conveyor as defined in claim 1 wherein said tube has a horizontal section and a pivotally mounted inclined section, and an idler roller engaging the top surface of the belt at the juncture of said sections.

8. A method of elevating liquids and semiliquids, comprising the steps of feeding the material to be elevated onto the lower end of the working face of the belt of an upwardly extending, endless, belt conveyor, said working face of which belt is provided, transversely thereof, with mutually spaced, longitudinally staggered, projections defining a plurality of continuous but devious channels extending endlessly with and superficially of said working face of the belt; and driving said belt at a speed such that the resistance of flow of said material by reason of frictional engagement thereof with belt and belt projection surfaces is greater than the kinetic energy of the material as it is being elevated.